Sept. 1, 1953  H. G. ANDERSON ET AL  2,650,547
WHEEL HOUSING COVER
Filed June 22, 1948  5 Sheets-Sheet 2

INVENTORS.
Harold G. Anderson
BY George B. Parsons
George R. Ericson
ATTORNEY

Sept. 1, 1953 H. G. ANDERSON ET AL 2,650,547
WHEEL HOUSING COVER
Filed June 22, 1948 5 Sheets-Sheet 3

INVENTORS
Harold G. Anderson &
BY George B. Parsons
George R. Ericson
ATTORNEY

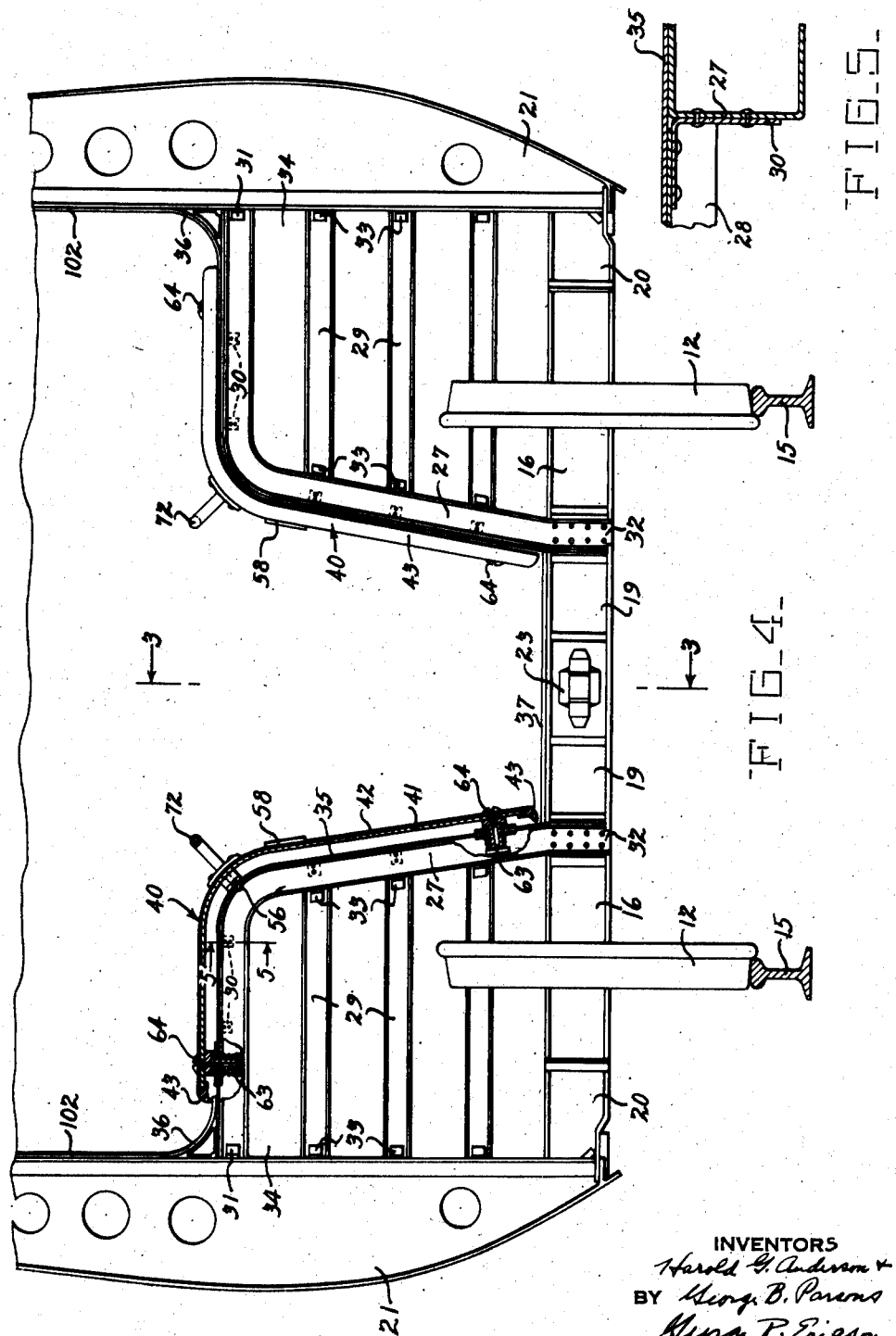

Sept. 1, 1953 H. G. ANDERSON ET AL 2,650,547
WHEEL HOUSING COVER
Filed June 22, 1948 5 Sheets-Sheet 5
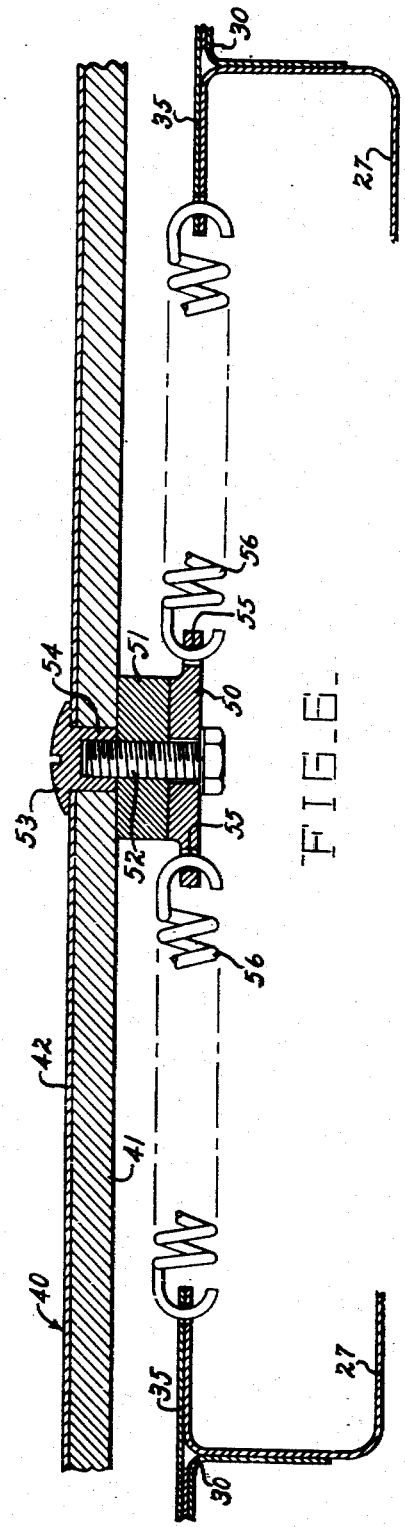
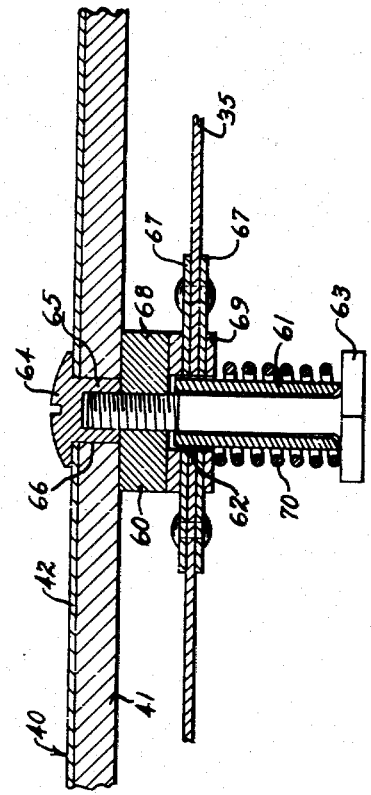
INVENTORS
Harold G. Anderson &
BY George D. Parsons
George R. Ericson
ATTORNEY Patented Sept. 1, 1953

2,650,547

UNITED STATES PATENT OFFICE 2,650,547

WHEEL HOUSING COVER

Harold G. Anderson, Fort Lee, N. J., and George B. Parsons, Roosevelt, N. Y., assignors to American Car and Foundry Company, New York, N. Y., a corporation of New Jersey Application June 22, 1948, Serial No. 34,364

13 Claims. (Cl. 105—4)

This invention relates to railway cars and more particularly to cover devices for wheel housings and the spaces between the adjacent ends of coupled cars.

To improve stability and accessibility, the present trend in railway car design includes lowering the center of gravity by locating the underframe in a plane a short distance above the tracks rails. With such design, the track wheels will project above the flooring interiorly of the car and wheel housings must be provided within the car body. To insure safety for passengers passing from one car to another, provision must be made for enclosing the space between adjacent housings of adjacent car ends and the space between the ends of the aisles at adjacent car ends.

It is an object of this invention to provide devices for covering side wheel housing structures at adjacent car ends and the spaces therebetween.

Another object of the invention is to provide rigid cover devices, for enclosing the spaces between adjacent wheel housing structures at adjacent car ends and the space therebetween, with fastening means that will permit quick application and removal.

A further object of the invention is to provide rigid cover devices between wheel housing structures at adjacent ends of cars with fastening means that will allow some movement of the car ends relative thereto.

Another object of the invention is to provide rigid cover devices for the space between wheel housing structures at adjacent car ends with centering means that will normally locate the devices centrally relative to the wheel housing structures.

Another object of the invention resides in the provision of a foot plate for spanning the space between the aisles at adjacent car ends.

These and other objects of the invention will be apparent to those skilled in the art from a study of the following description and accompanying drawings, in which:

Figure 4 is an end elevation of a car showing the cover devices attached with one in section.

Figure 5 is a sectional view taken on line 5—5 of Figure 4.

Figure 6 is a sectional view taken on line 6—6 of Figure 3.

Figure 7 is a sectional view taken on line 7—7 of Figure 3.

Figure 1:
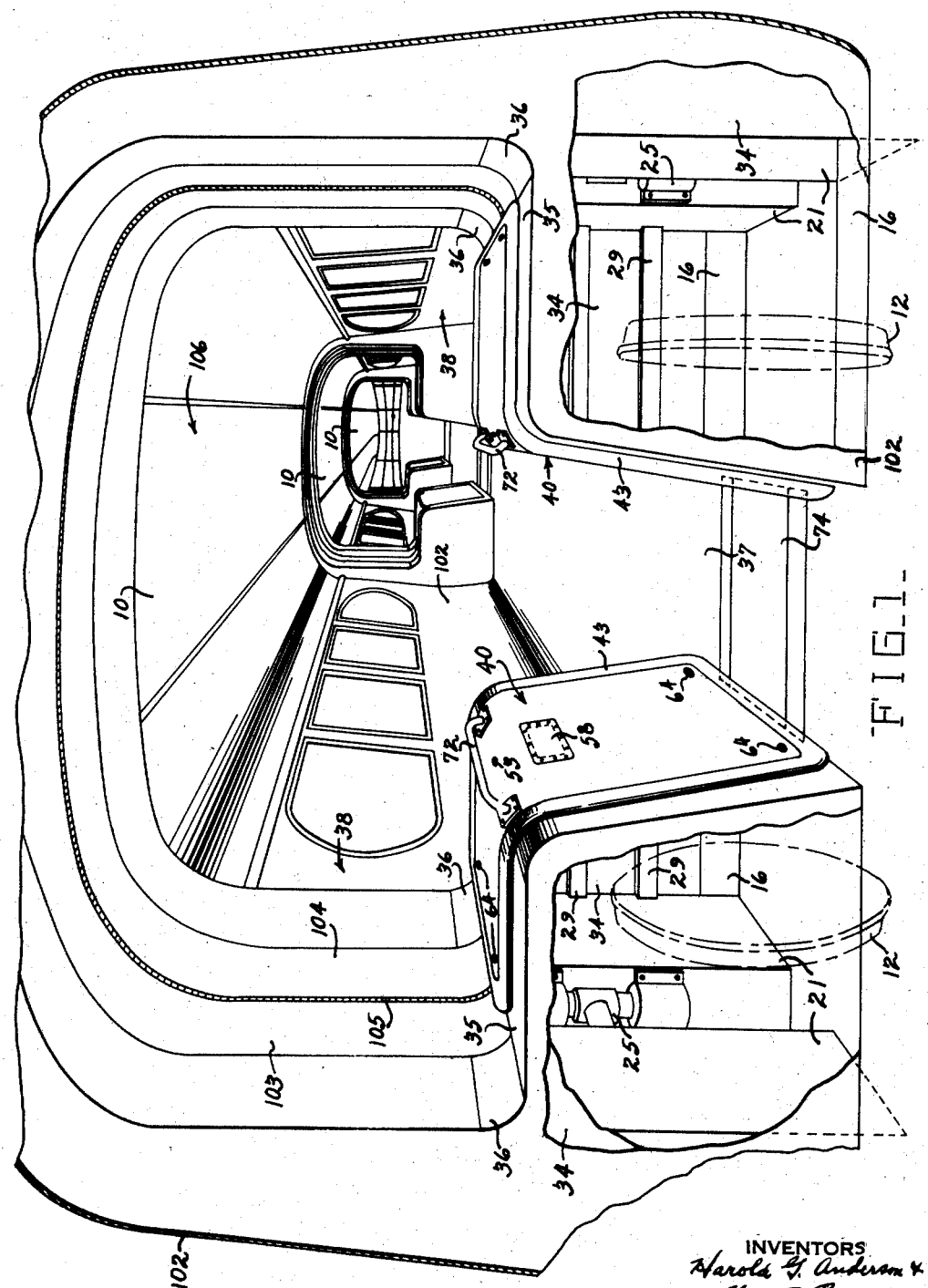
Figure 1 is an interior perspective view of a train incorporating the invention.
Figure 2:
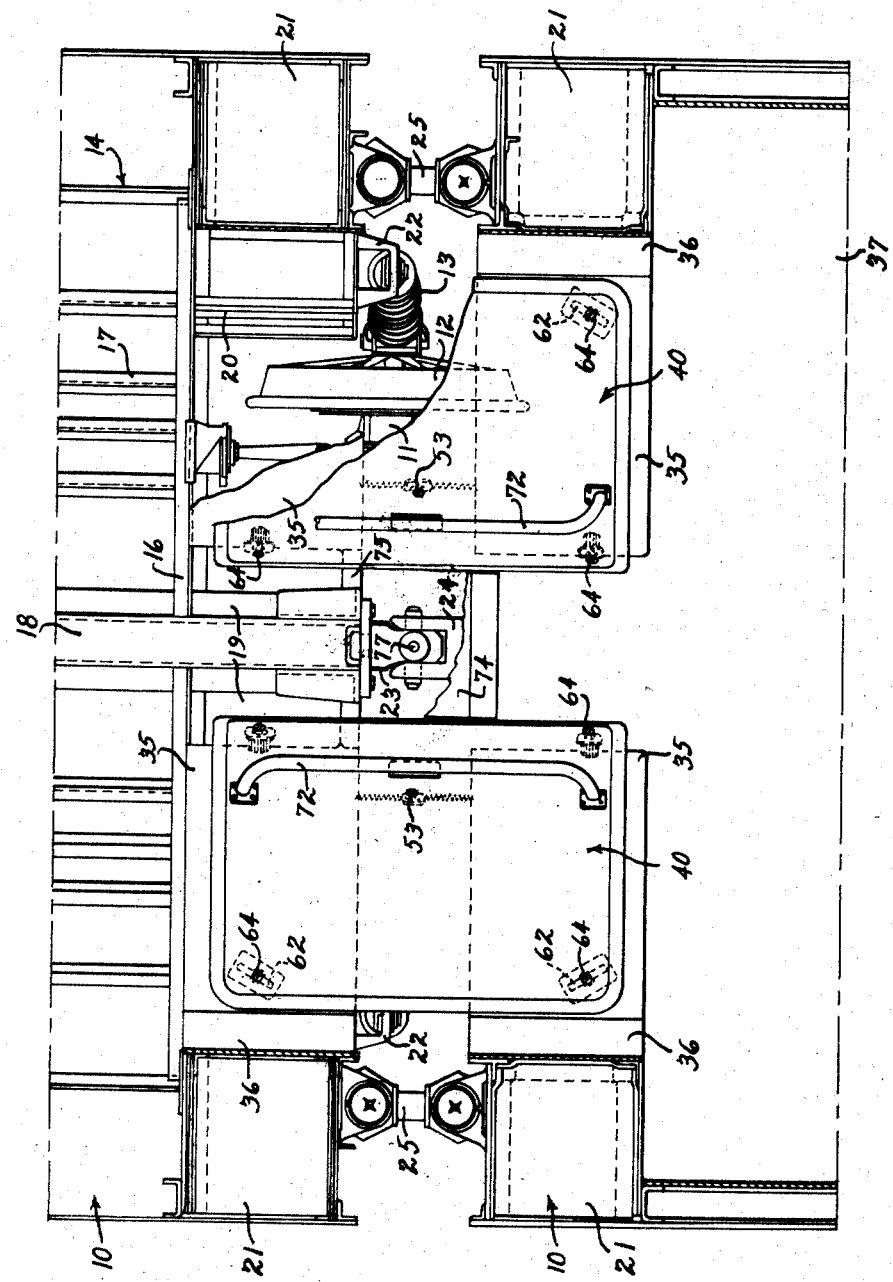
Figure 2 is a horizontal sectional view of the adjacent ends of two cars showing the wheels, wheel mounting, wheel housing structures and cover devices.
Figure 3:
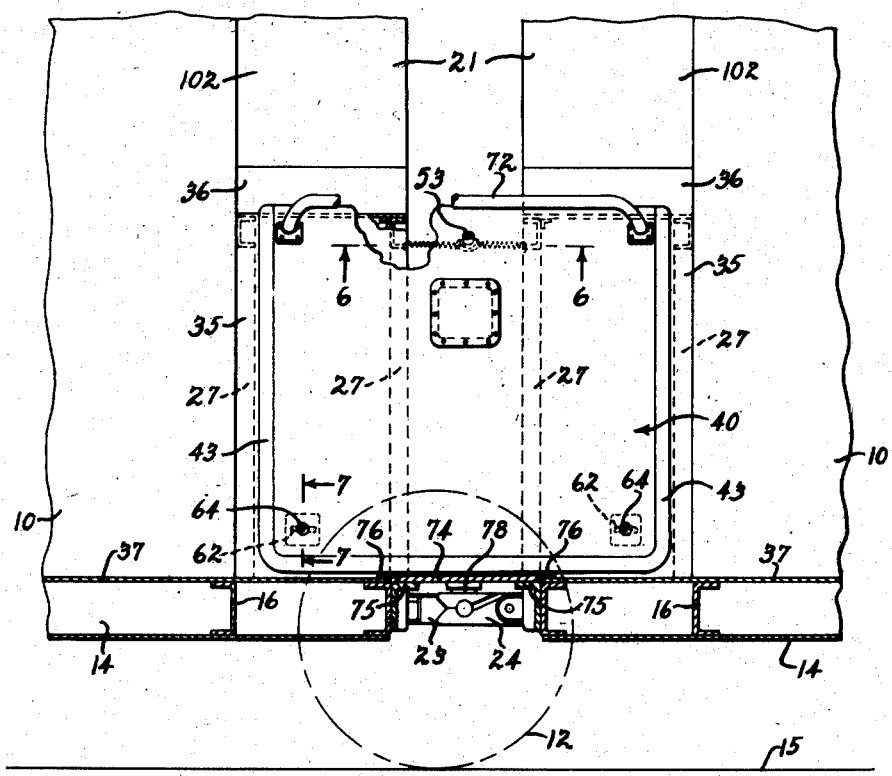
Figure 3 is a fragmentary sectional view of the adjacent ends of two coupled cars taken on line 3—3 of Figure 4.

A plurality of similar cars 10 are coupled together to form a portion of a railway train as shown in Figure 1. A transverse axle 11 mounted on track wheels 12 is arranged at the rear end of each car and a spring mounting structure 13 connects each end of the axle with the car underframing 14. The wheels 12 are mounted on track rails 15.

The underframing has transverse end sills 16 between which longitudinal girders 17 extend and a center sill 18 is coextensive with the underframe and has its ends extending beyond end sills 16. The underframe also includes spaced portions 19 and 20 extending longitudinally beyond the end sills 16 on each side of the center sill, the spaces between the portions 19 and 20 being provided for reception of the track wheels which extend above the plane of the underframing. The framing also includes outer end post structures 21 and conventional side and roof framing (not shown). The upper ends of the spring mounting structures are secured to brackets 22 fixed to the rear end posts 21.

The rear end of the center sill has a draft coupling member 23 fixed thereto and the front end of the center sill has a draft coupling member 24 fixed thereto. These members at adjacent car ends serve to connect the cars and swivel to allow relative movement of the car ends. The front end of each car is supported by separable side mounting devices 25 on the rear end of the preceding car, such devices allowing limited movement of the car ends in any direction.

The ends of adjacent cars are spaced by the side mounting and coupling devices which connect the cars in trailer relation. The track wheels are mounted to the rear of the cars so that they extend past the forward end of the adjacent cars and for this reason the front and rear ends of the cars are similar to provide spaces in the underframing through which the track wheels extend.

Similar housing structures are provided at each side of each end of the cars to enclose the track wheels. These structures include longitudinally spaced similar frame members 27 having an upper transversely extending portion and an inclined lower vertical extending portion, longitudinally extending members 28 and transversely extending members 29. The upper portion of members 27 are secured at 31 to the adjacent end post and the lower portion of such members are secured at 32 to the side of the adjacent underframing 19. Members 28 span the space between members 27 and are secured flush with the inner surfaces thereof by angle irons 30. Members 29 are secured at one end to the lower vertical portions of members 27 and at their other end to the adjacent end posts by angle irons 33. Bulkheads 34 are secured over the inner ends of the wheel housing frames, enclosure plates 35 are secured over the top and side of the wheel housing frames and cover plates 36 extend lengthwise of the housing frames between the end posts and the outer edge portions of plates 35. The spaces interiorly of the cars bounded by end sills 16 and underframing sections 19 and 20 are thus boxed in and the ends of the aisles are defined by the enclosure plates 35 on the vertically extending portions of the wheel housing frames. The underframing is covered by flooring 37 extending between the side walls 38 from end sill to end sill and over the space between the bottom of adjacent enclosure plates 35 at each end of the car. The side walls, roof 106 and bulkheads are covered by an inner skin 102 which extends to a point flush with cover plates 36. The space between the ends of the cars is enclosed by diaphragm sections 103, 104 connected together by a zipper fastener 105 and such sections are secured to the end of the cars along the end posts and the connecting roof.

A cover device 40, conforming in shape to the enclosure plates 35, is provided to span the space between and to lie over the major portion of each pair of longitudinally aligned wheel housing structures at adjacent ends of the cars. The cover devices are formed as rigid structures and are shown as comprising an under section 41, an outer section 42 suitably secured to the under section and a marginal finger guard section 43. The outer section is preferably formed of a suitable composition material, such as rubber, and its outer edge is turned in toward the wheel housing.

Means are provided to center the devices longitudinally relative to the underlying wheel housing structures and is of such a nature that it will permit shifting to the car ends relative thereto and quick attachment or detachment. To this end, see Figure 6, an anchor member 50 is secured to a spacer 51 beneath the cover device by a bolt 52 and a cap nut 53 having a shank 54 extending through an opening in the cover device is screwed on the end of the bolt extending into the opening. It will be noted that the bolt fastens the spacer and anchor member together and that the cover is fastened or released from the spacer by application or release of the cap nut. The anchor member has openings 55 for receiving ends of coil springs 56 which are also anchored to the end wheel housing frame members 27 of adjacent car ends. This spring connection between the cover device and the adjacent wheel housings will allow longitudinal shifting of the car ends relative to the cover device, but the springs will normally maintain the cover in a centered position. In order to detach the springs, which is necessary to uncouple the cars, a hand hole 57 is provided in the cover and is closed by a cover plate 58 detachably secured by screws 58'.

The cover devices are mounted on the wheel housing structure by means that will permit vertical and angular movement of the car ends relative thereto, such means being located preferably adjacent the top and bottom corners of each cover device. These mounting means are similar and engage the enclosure plate 35. They include, see Figure 7, a bearing and spacer nut 60 beneath the cover device, a sleeve 61 passing through a slot 62 in plate 35, a bolt 63 passing through the sleeve and screwed through the bearing nut and cap nut 64, the latter having an internally threaded shank 65 extending into opening 66 in the cover device and screwed on bolt 63. The area of the enclosure plate 35 adjacent slot 62 is provided with lubricated bearing plates 67 riveted thereto and outside of such plates is provided washers 68, 69. Coil spring 70 surrounds sleeve 61 with one end bearing against the head of bolt 63 and the other end bearing against washer 69. Slot 62 is of sufficient width to provide some clearance for the sleeve 61 so that the wheel housing structures can tilt a limited extent relative to the cover device. When the cap nut is removed from bolt 63, the cover device can be removed but the rest of the mounting structure will be held together in position on the wheel housing structure by the connection of nut 60 and bolt 63. The spring 70 is placed in compression by screwing nut 60 down on the bolt so that considerable force will be required to lift the cover away from the wheel housing structure. There is some clearance left between the sleeve 61 and nut 60 so that the cover is not rigidly attached to the housing and there can be some relative movement thereof. The slots 62 are disposed to permit the adjacent wheel housing structures at adjacent car ends to swing transversely relative to the cover devices and to each other in traveling around a curve. The top slots are arcuately disposed on a radius from the swivel draft coupler connection and the bottom slots are substantially horizontal. The cover devices will remain substantially stationary while the car ends change their angular relation. Thus the width of the aisle-way between the adjacent car ends will vary very little when the cars are swinging angularly relative on a curved track. Likewise the mounting devices allow some vertical movement of the car ends without shifting the position of the cover devices therewith.

In order to aid the passengers in walking from car to car the cover devices have hand rails 72 fixed thereto.

A foot plate 74 is provided to span the aisle space between adjacent car ends. This plate bears at its ends against angle bars 75 at the end of underframing sections 19 and carries end plates 76 that overlie the flooring 37 between the wheel housings. The coupling section 23 above its swivel connection with coupling section 24 is formed with a socket 77 for the reception of a pin 78 fixed centrally to the underside of the foot plate. The foot plate is mounted to allow some relative lateral movement of the car ends as permitted by the clearance between its ends and the adjacent wheel housing structures.

The invention may be modified in various respects as will occur to those skilled in the art and the exclusive use of all modifications as come within the scope of the appended claims is contemplated.

What is claimed is:

1. In a railway train, a pair of spaced cars having underframing, detachable draft coupling members connecting the cars, transversely spaced wheel housing structures secured on each side of the adjacent ends of the underframing of the cars, a foot plate spanning the space between adjacent car ends and extending between the pairs of wheel housing structures, the ends of said plate being of less width than the space between said housing structures in each car, one of said members of the draft coupling connecting said cars having a socket therein, and a pin secured to said plate projecting into the socket in said draft coupling.

2. In a railway train, two adjacent spaced cars having underframing, detachable draft coupling members connecting said cars, transversely spaced wheel housing structures fixed on the adjacent ends of the underframing of said cars, and a foot plate swivelled on one of the draft coupling members and having its ends extending between the spaced housing structures at the adjacent ends of the cars, said spaces between the housing structures of each car being slightly wider than the ends of the foot plate therebetween to permit only limited relative movement of the foot plate and car ends.

3. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, and detachable means securing the cover devices to the underlying wheel housing structures.

4. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, and mounting means between the cover devices and the underlying housing structures, a portion of said mounting means being accessible from the exterior of the cover devices for securing or releasing the same.

5. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, mounting means connecting said cover devices with the underlying wheel housing structures in relation allowing limited movement of the wheel housing structures relative to the cover devices, and spring means mounted between and opposing movement of the housing structures relative to the cover devices.

6. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, spacer means between the cover devices and the underlying wheel housing structures, and securing means fastening the cover devices to the wheel housing structures.

7. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, and means loosely connecting the cover devices to the underlying wheel housing structures whereby the housing structures may move a limited extent relative to the cover devices in vertical and transverse directions.

8. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, means loosely connecting the cover devices with the underlying wheel housing structures, and centering means for the cover devices connected to the underlying wheel housing structures.

9. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, means loosely connecting the cover devices to the underlying wheel housing structures, anchor members fixed to the bottom of the cover devices in the space between the car ends, and opposed centering spring means connected to the wheel housing structures and the anchor members.

10. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, rigid cover devices spanning the spaces between opposed recesses and at least partially overlying the adjacent wheel housing structures, detachable centering devices attached to the underside of the cover devices between the car ends and to the ends of the underlying wheel housing structures, said cover devices having a hand hole adjacent the attachment point of the centering devices to the cover devices, and closures for the hand holes detachably secured to the cover devices.

11. In a railway train, a pair of coupled spaced cars having framing with opposed recesses adjacent the sides of the adjacent ends, each pair of opposed recesses forming a space of sufficient size to accommodate a car supporting wheel, upstanding wheel housing structures fixed on the framing around the portions of the recesses nearest the interiors of the cars, and rigid cover devices spanning the spaces between opposed recesses and at least partially overlying the adjacent wheel housing structures, said cover devices comprising a rigid annular inner section and a marginal finger guard section around the inner section.

12. In a railway train, a pair of coupled spaced cars having framing providing opposed recesses adjacent one side of their adjacent ends, the opposed recesses forming a space of sufficient size to accommodate a supporting track wheel for the cars, upstanding fram structures of less height than the car interiors fixed on said framing around the portions of the recesses nearest the interiors of the cars, and a rigid angular cover device extending over the sides and tops of the upstanding frame structures and spanning the space between the cars.

13. A unitary device for forming one side of a passageway between and at the adjacent ends of coupled railway cars comprising a rigid angular member adapted to span the space between the ends of adjacent cars and to extend inwardly of such car ends, said member including a vertically extending lower portion of less height than the car interiors and a horizontal upper portion extending away from the top of the lower portion, a handrail extending longitudinally of said member, and means securing said handrail to said member.

HAROLD G. ANDERSON.
GEORGE B. PARSONS.

References Cited in the file of this patent

UNITED STATES PATENTS

| Number | Name | Date |
|---|---|---|
| 1,535,799 | Adams | Apr. 28, 1925 |
| 2,217,033 | Van Dorn | Oct. 8, 1940 |
| 2,354,045 | Nystrom et al. | July 18, 1944 |

FOREIGN PATENTS

| Number | Country | Date |
|---|---|---|
| 163,239 | Spain | Nov. 27, 1943 |